US008390255B1

(12) United States Patent
Fathollahi

(10) Patent No.: US 8,390,255 B1
(45) Date of Patent: Mar. 5, 2013

(54) BATTERY CASE FOR MOBILE DEVICE

(75) Inventor: Andy Fathollahi, Corona Del Mar, CA (US)

(73) Assignee: Incipio Technologies, Inc., Irvine, CA (US)

( * ) Notice: Subject to any disclaimer, the term of this patent is extended or adjusted under 35 U.S.C. 154(b) by 0 days.

(21) Appl. No.: 13/489,325

(22) Filed: Jun. 5, 2012

Related U.S. Application Data

(60) Provisional application No. 61/651,981, filed on May 25, 2012.

(51) Int. Cl.
H02J 7/00 (2006.01)
G06F 1/16 (2006.01)
B65D 81/24 (2006.01)

(52) U.S. Cl. ............ 320/115; 361/679.56; 361/679.41; 206/308.3

(58) Field of Classification Search .................... 320/115
See application file for complete search history.

(56) References Cited

U.S. PATENT DOCUMENTS

| 7,199,554 | B2 * | 4/2007 | Kim et al. ................. 320/114 |
| D556,681 | S | 12/2007 | Kim |
| D561,092 | S | 2/2008 | Kim |
| 7,375,967 | B2 * | 5/2008 | Huang et al. .............. 361/707 |
| 7,479,759 | B2 * | 1/2009 | Vilanov et al. ............ 320/115 |
| 7,612,997 | B1 | 11/2009 | Diebel et al. |
| 7,638,969 | B2 | 12/2009 | Woud |
| 7,782,610 | B2 * | 8/2010 | Diebel et al. ............ 361/679.56 |
| 7,889,498 | B2 | 2/2011 | Diebel et al. |
| 8,013,572 | B2 | 9/2011 | Rodgers |
| 8,183,825 | B2 * | 5/2012 | Sa ........................... 320/107 |
| 2003/0218445 | A1 | 11/2003 | Behar |
| 2007/0152633 | A1 * | 7/2007 | Lee .......................... 320/114 |
| 2011/0159324 | A1 | 6/2011 | Huang et al. |
| 2011/0199041 | A1 * | 8/2011 | Yang ......................... 320/101 |
| 2011/0234152 | A1 * | 9/2011 | Frossen et al. ............ 320/107 |

FOREIGN PATENT DOCUMENTS

JP 2001-093586 4/2001
KR 10-2011-0040622 4/2001

* cited by examiner

Primary Examiner — Yalkew Fantu
(74) Attorney, Agent, or Firm — Knobbe Martens Olson & Bear LLP

(57) ABSTRACT

A battery case for a mobile device is provided comprising a case, electrical components, a port, and an aperture size to contain at least one rechargeable battery. Also provided is a charger including a mount to receiving a rechargeable battery. The rechargeable battery may be configured to fit inside of the battery case. The charger may be figured to fit inside of the battery case.

15 Claims, 14 Drawing Sheets

BATTERY CASE FOR MOBILE DEVICE

CROSS-REFERENCE TO RELATED APPLICATION

This application claims the priority benefit of U.S. Provisional Application No. 61/651,981, filed May 25, 2012, the entirety of which are hereby incorporated by reference herein.

BACKGROUND

1. Field

This application relates to improved battery cases and chargers for use with a mobile device.

2. Description of the Related Art

Mobile devices are known to come with an internal battery, used to power the mobile device. However, internal batteries are known to have a limited life. To provide additional power, for at least cell phones, external battery cases for the mobile device have been provided, such as those disclosed in US Patent Application No. 2011-0159324 that could provide additional battery life to the mobile device.

Battery cases like the ones disclosed in the aforementioned application, are designed with a non-removable battery stored inside of the case that can be charged through connection of the case containing the battery to a power source such as a computer or power outlet. Thus, once the battery inside of the mobile device and the battery inside of the case have completely drained, a user would have to recharge the battery case and/or the mobile device in order to continue to use the mobile device without the delays inherent in charging the device. This circumstance may be especially inconvenient when a user is traveling and power outlets are not readily available.

SUMMARY

An aspect of at least one of the embodiments disclosed herein includes the realization that rechargeable battery cases run out of power, and may benefit from a compact, rechargeable battery system. For example, a kit may comprise a case comprising at least one side protector, electrical components, a port, and an aperture sized to removably contain at least one rechargeable battery, the case configured to protect a mobile device. The kit may also comprise at least one rechargeable battery, a rechargeable battery charger comprising a surface for receiving at least one rechargeable battery, and the case may further include a single continuous piece or multiple pieces, defining a perimeter of the case. The charger may fit within the perimeter of the case. Because of travel and/or lack of access to charging facilities, it can be difficult to maintain a charge in a mobile device, even with the use of an external battery-containing case. It is also difficult to pack an external battery charger, as such chargers may take up additional space in a user's luggage/purse/briefcase, etc. Thus, it would be advantageous to have a kit that allows for more than one battery to charge at the same time, and for the charger and case to fit within one another for compactness and ease of packing and carrying in travel.

Another aspect of at least one of the embodiments disclosed herein includes the realization that users of battery mobile device cases desire a case which secures and protects the mobile device, and a case that is less likely to fall apart when dropped. For example, a protective case may comprise electrical components, at least one port, and an aperture sized to contain at least one rechargeable battery, a base portion containing the electrical components and an aperture sized to contain at least one rechargeable battery, and a bumper comprising a single piece or multiple pieces, the bumper configured to fit on top of the base portion, and a nested portion, located between the bumper and the base portion. In some embodiments, the bumper may be configured such that if a mobile device is being protected within the case, if dropped, the bumper positioned on top of the base portion and around the mobile device stays in place on the base portion in a single piece, thus protecting the case. This single piece bumper may also be interchangeable with bumpers of other colors or materials, thus allowing for personalization of the case. Thus, it would be advantageous to have a protective battery case that secures and protects the mobile device when dropped, and allows for personalization of the protective case.

Thus, in accordance with an embodiment, an assembly may comprise a case comprising at least one side protector, electrical components, a port, and an aperture sized to contain at least one rechargeable battery, the case being configured to protect a mobile device. The system may also include a rechargeable battery charger, the rechargeable battery charger being configured to recharge at least one rechargeable battery and discharge power to an outside source. The system may also include at least one charging cable configured to connect the charger with a power source, at least one connector configured to connect the charger with the case, and at least one rechargeable battery.

BRIEF DESCRIPTION OF THE DRAWINGS

These and other features and advantages of the present embodiments will become more apparent upon reading the following detailed description and with reference to the accompanying drawings of the embodiments, in which.

DETAILED DESCRIPTION

An improved battery case for a mobile device and kit comprising the improved battery case, rechargeable batteries, and a battery charger is disclosed herein. The embodiments disclosed herein are described in the context of a battery case for a cell phone and associated kit for use with the cell phone because the embodiments disclosed herein have particular utility in this context. However, the embodiments and inventions herein can also be applied to other types of electronic devices, including, but not limited to tablets, PDAs, e-readers, mp3 players (such as an iPod®), laptops, etc.

Figure 2:
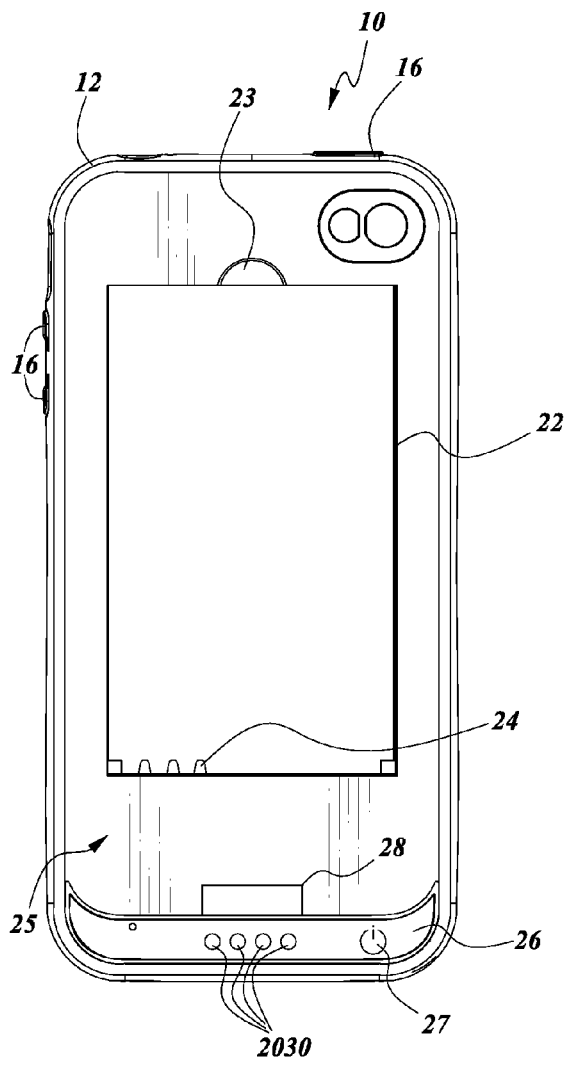
FIG. 2 is a top plan view of the case of FIG. 1.
Figure 3:
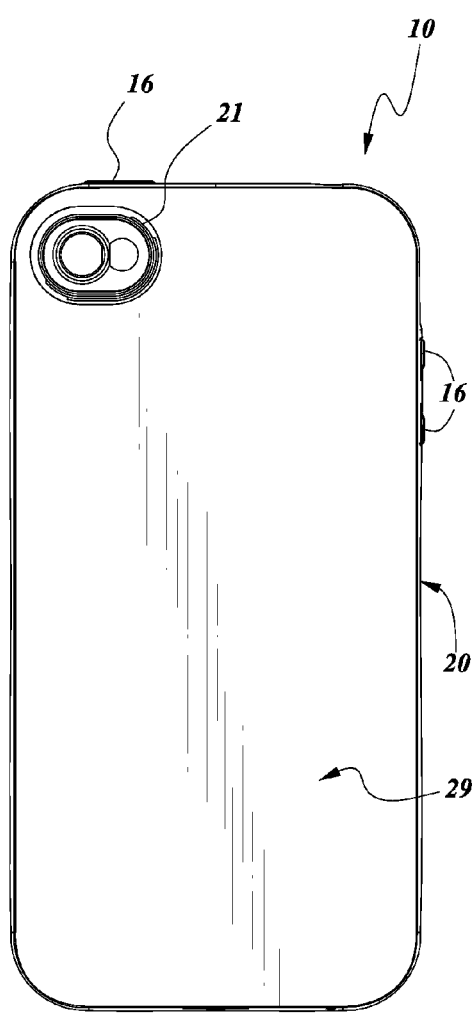
FIG. 3 is a rear plan view of the case of FIG. 1.
Figure 4:
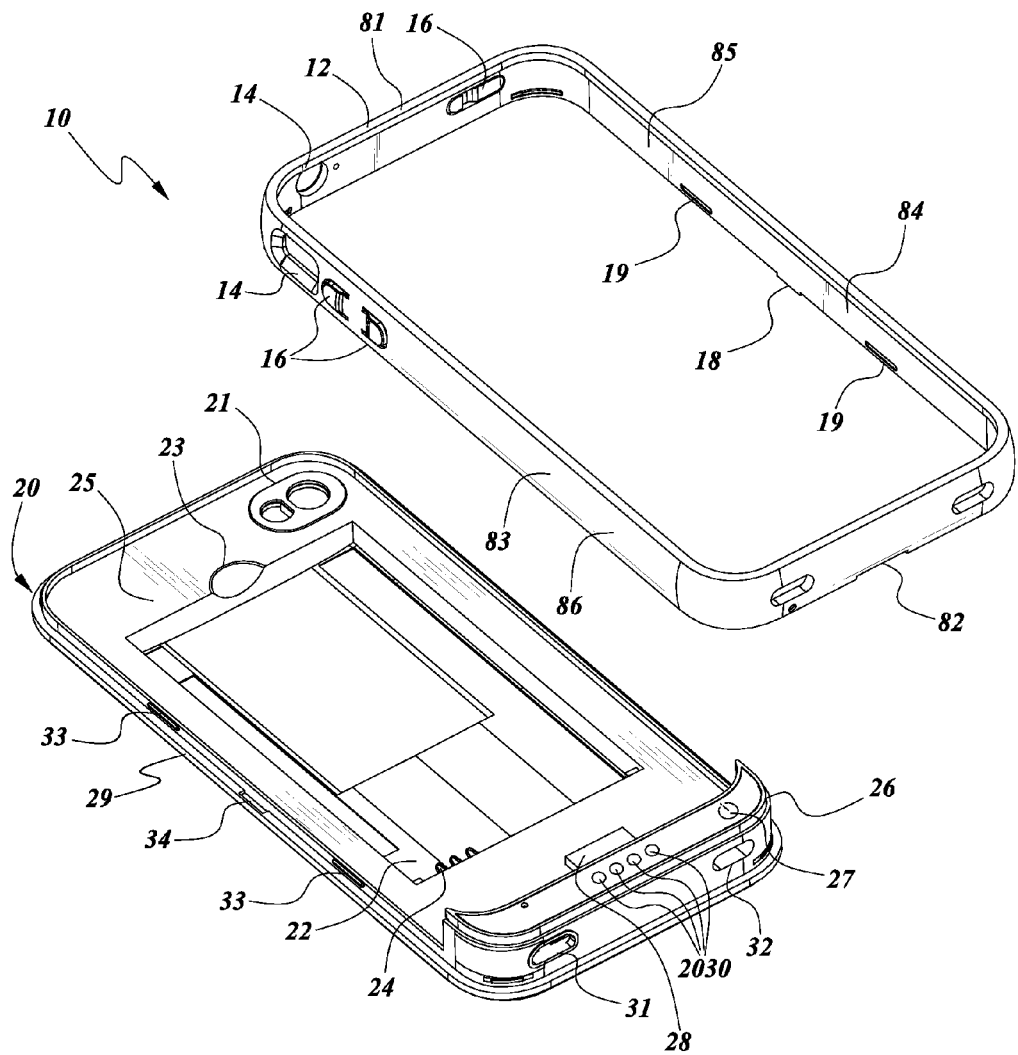
FIG. 4 is a front side perspective exploded view of a battery case according to the case of FIG. 1.
Figure 4A:
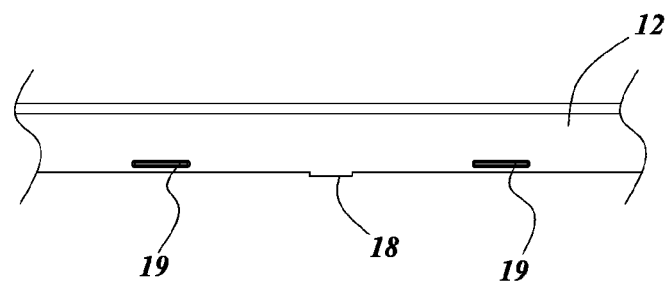
FIG. 4A is a right side plan magnified view of the interior of a bumper portion of the case of FIG. 1.

With reference to FIGS. 1-4, an improved battery case for a mobile device can comprise a case 10. As best seen in FIG. 4, the case 10 generally comprises a base portion 20 and a side protector or bumper portion 12. The case 10 can be generally shaped to contain and protect a mobile device (e.g. an iPhone®). When placed inside of a case, the mobile device (FIGS. 6C and 6D) desirably fits snugly, although the user desirably still has access to the buttons and/or touch screen of the mobile device either directly through apertures in the case 10 or indirectly through button features included on the bumper portion 12 or base portion 20. According to some embodiments, the bumper portion 12 and the base portion 20 are attached together permanently or semi-permanently to comprise a single integral unit. According to other embodiments, the bumper portion 12 and the base portion 20 comprise a case 10 that comprises two pieces that are releaseably attached together to contain a mobile device, as illustrated in the embodiment of FIG. 4.

Figure 1:
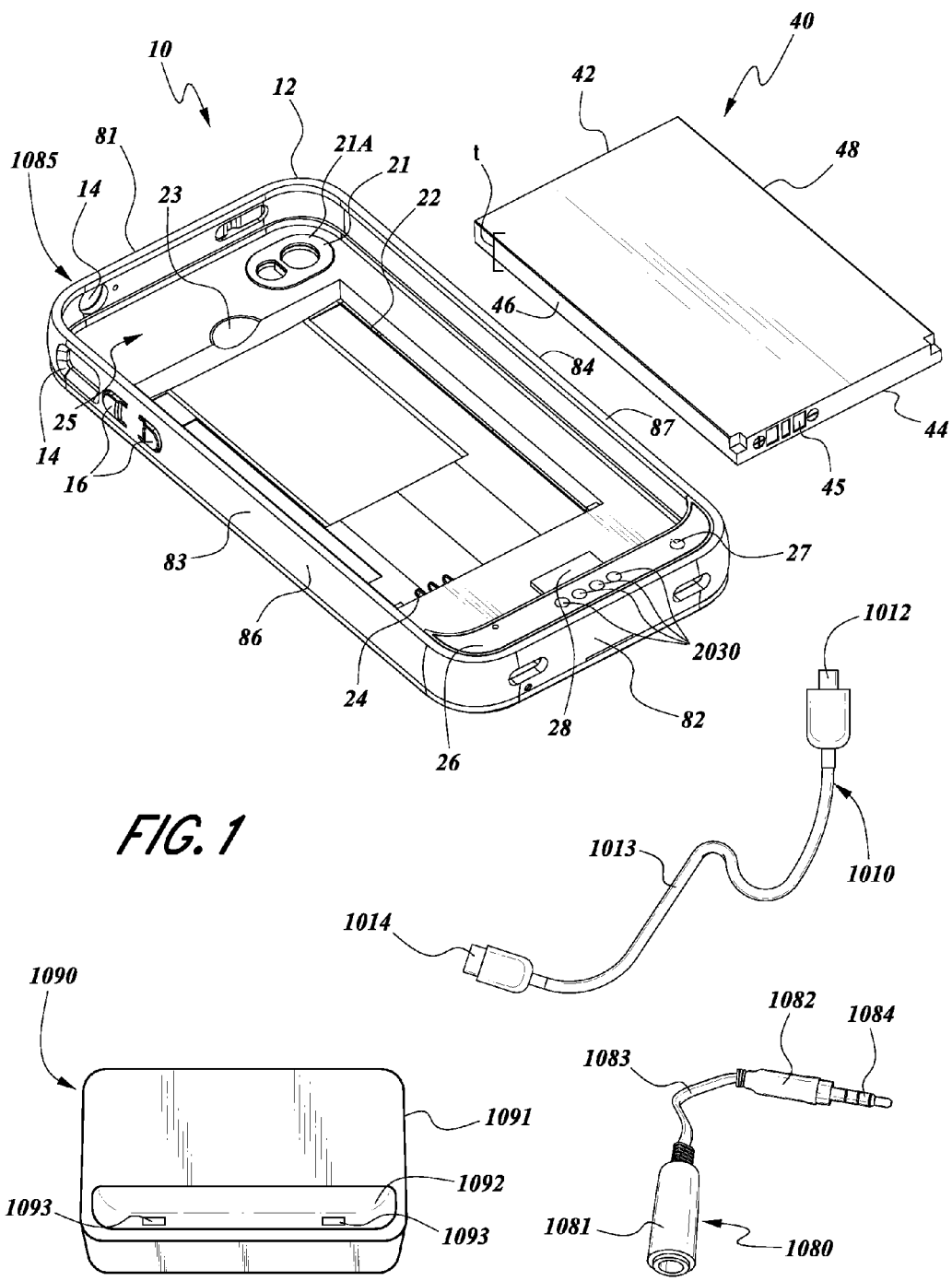
FIG. 1 is a front side perspective view of an assembly, including a battery case and a rechargeable battery according to one embodiment.

As illustrated in FIGS. 1-4, the bumper portion 12 can comprise a single piece, forming a perimeter of the case 10. The bumper portion 12 may comprise a first side or end 81 and a second side or end 82 opposite the first end 81. The bumper portion 12 may also have a third side 83 opposite a fourth side 84. The bumper may also have an inner surface 85 and an outer surface 86. The bumper portion 12 may also have a front edge 87. Desirably, the front edge 87 is flush or substantially flush with the screen or display of a mobile device when the mobile device is within the case. However, in other embodiments, the front edge 87 extends over or overhangs at least a portion of the mobile device screen when a mobile device is inserted in case 10. As is shown in FIGS. 1 and 4, the bumper comprises a single side protector which is configured to protect each of the four sides of a mobile device received within the case 10. Alternatively, however, the case could have one or more separate side protector corresponding to each individual side of the mobile device, or have one or more separate side protectors which wrap around the corner of the mobile device and therefore protect at least a portion of two or more sides of the mobile device.

In some embodiments, the continuous bumper portion 12 may comprise two or more pieces that connect together to form a perimeter of the case 10. The two or more pieces may interlock together to protect the sides of a mobile device. However, in other embodiments, the bumper may comprise two or more pieces that may be integral with two or more pieces of the base portion of the case. In such an embodiment, the two or more pieces of the case each comprising a piece of a bumper portion and a piece of the base portion may connect to one another around a mobile device, via an appropriate mechanism such as a slide-and-lock mechanism.

The bumper portion may include feature apertures 14 corresponding to features on the mobile device, for example, the headphone inlet and the vibrate switch (illustrated). Other feature apertures may be incorporated into the bumper portion 12 to allow for access to the on/off button, speakers, volume controls, Bluetooth® switch, and other such features present on the mobile device. The bumper portion 12 may also include button features 16 corresponding to other features on the mobile device such as volume controls and sleep or on/off switches (illustrated). The button features 16 may also be formed into the bumper portion to correspond to other features of the mobile device. The button features 16 may be raised and/or molded into the bumper portion 12, as thus made of the same material of the bumper portion 12. However, in some embodiments the button features 16 may be made of a different material than the bumper portion 12, or they may comprise an additional material, such as rubber, coated on the button features 16 to improve tactility and use of the button features 16.

The bumper portion 12 may be made of a plastic or polymeric material. In some embodiments, the bumper portion 12 is molded in a single piece, and is made of a suitable material such as polycarbonate, polypropylene, polyvinyl chloride, and the like. The bumper portion 12 may be made by a suitable process such as injection molding. Preferably the bumper portion 12 is made of a material that is suitably flexible to allow a mobile device to fit snugly within the bumper portion 12 and to allow the button features 16 to flex and contact the corresponding buttons on a mobile device without fracture. Additionally, the material may be impact resistant enough to resist fracture when the case 10 containing a mobile device is dropped from a user's hand, a table, a desk and similar heights onto a variety of surfaces including concrete, asphalt, carpet, and the like. Such a height may include heights such as six feet, five feet, four feet, three feet, and the like.

Additionally, the bumper portion 12 may be made of a plastic or polymer material that can be made in a variety of hues. By providing a bumper portion 12 that can be made in a variety of colors, a user can personalize the battery case 10, without having to purchase a new base portion 20, which may include components that are much more expensive and/or difficult to manufacture than bumper portion 12. In some embodiments, the bumper portion 12 may be made of a plastic or polymeric material that is red, blue, orange, yellow, green, purple, pink, white, black, or a mixture of any of the above. The bumper portion 12, in certain embodiments, may also be made of a variety of materials, thus allowing for further personalization of the case 10.

As illustrated in FIGS. 3 and 4, base portion 20 forms the base of the case and is configured to support the mobile device and provide a base to which the bumper portion 12 can attach. The base portion 20 may include a thin substantially rectangular body defining a back panel 29 adapted to form an outer surface of the case 10 and an inside panel 25 adapted to support and be positioned adjacent to a mobile device. The case and, desirably, the inside panel 25 define a plane corresponding to the position of the back surface of the mobile device when it is positioned within the case 10. The base portion 20 may further include a nested portion 26 extending from the inside panel 25 opposite the back panel 29.

In some embodiments, electrical contacts may be present on the base portion of the case 20. The electrical contacts may be located near or on the bottom end of the base portion 20. In other embodiments, the electrical contacts may be located elsewhere along the back panel 29. The electrical contacts may be configured to connect to a charging device.

A data or charging device may comprise any device that may transfer power from a power source to the case 10 and/or charger 50. In some embodiments, the charging device may be a charging and/or data cable such as charging cable 1010.

In other embodiments, the charging device may include a charging cradle 1090 in addition to or instead of a charging cable 1010. A charging cradle may include a base 1091 that may include a concave surface 1092 shaped to fit a case 10. The concave surface 1092 may also assist in holding a case alone or a case containing a mobile device upright. The charging cradle, in some embodiments, may also be able to charge the charger 50. In some embodiments, the base may be relatively planar, and the case may be laid flat upon the base. The charging cradle 1090 may also include one or more leads 1093 that may transmit power to corresponding contacts on the case 10 or charger 50 when the contacts are touching the leads 1093. The base may also include a plug or port or means to provide power to the base. The base 1091 may also include a plug or port or means to provide power to the base 1091. In some embodiments, the charging cradle 1090 may include a port configured to plug into the case 10 to provide power to charge the case with or without a mobile device contained therein.

A charging cradle 1090 may be configured to charge the case with or without a rechargeable battery contained therein and with or without a mobile device. The charging cradle 1090 may be able to charge any piece of the mobile device assembly inductively or conductively.

The base portion may further comprise a feature opening or window 21, shaped to allow a view of a feature located on the rear of the mobile device, such as a camera lens (illustrated). According to some embodiments, a camera lens insert 21A may be inserted into the feature opening 21. Such insert may protect the case 10 from scratching the surface of a mobile device contained within the case. The base portion also may define a battery aperture 22, shaped to contain a rechargeable battery 40. Electrical components (not illustrated) may also be contained within the base portion 20. The nested portion 26 may extend above the inside panel 25 so as to be flush or substantially flush with the outer edge of the bumper portion 12. In some embodiments, "substantially flush" may mean that the nested portion 26 extends above or below the bumper portion 12, a distance of about 1 mm, 2 mm, 3 mm and the like. The nested portion 26 may comprise a plug 28 and controls 27. The inside panel 25 and bumper portion 12, when the case is assembled, may form an inner portion containing the nested portion 26, inside panel 25 of the base portion 20, and the inner side of the bumper portion 12. The inside panel 25 may be attached to the back panel 29 by a suitable adhesive such as an epoxy or acrylic.

Electrical components, which may be contained within the nested portion 26, may comprise such components as wires, printed circuit boards, capacitors, resistors, and the like. The electrical components may transfer the charge from the battery 40, when placed in the battery aperture 22 to a mobile device connected to the plug 28. The controls 27 may also operate the electrical components. The electrical components may also allow the battery 40 to be charged when placed in the battery aperture 22 in the case 10 when a charging cable 1010 is inserted into the inlet 31 and connected to a power source such as a computer or a power outlet.

The charging and/or data cable 1010 may have a male connector 1012, at one end configured to be inserted into the case 10, another male connector 1014 at the other end shaped to connect to a power source, and a wire 1013 joining the connectors 1012, 1014. The charging and/or data cable 1010 may be capable of transferring power and/or data between a power source and/or computer and a case.

The charging cable 1010 may be any type of cable having any number of wires that can electronically connect the case 10 to a computer or power source. In one embodiment, the cable is a USB cable (e.g., a USB 2.0 cable) where male connector 1012 is a USB mini-A plug and male connector 1014 is a USB type-B plug. The charging cable 1010 may allow rechargeable battery 40, an internal battery of a mobile device, or both to be charged by a computer and/or power source. In some embodiments, when the charging cable 1010 connects the case 10 to a computer, the mobile device and the computer may be synchronized or synched. In such embodiments, the cable 1010 may be configured to transfer data from the mobile device contained within the case to a computer and/or from a computer to the mobile device contained within the case.

The cable 1010, in some embodiments, may be able to charge an internal battery within the case, a rechargeable battery positioned within the case, or a mobile device placed inside of the case. In some embodiments, the charging cable may be able to charge a mobile device within a case, even though no rechargeable battery is present in the case.

Figure 1A:
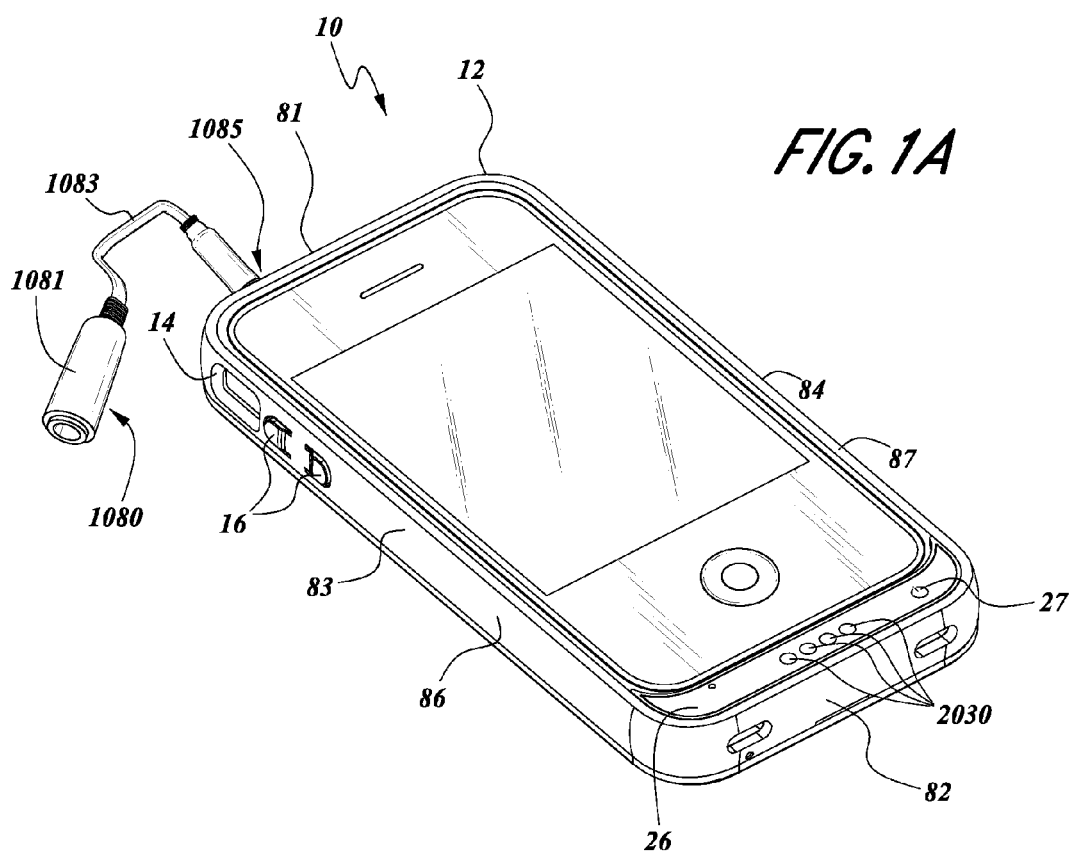
FIG. 1A is a front side perspective view of the case of FIG. 1 containing a mobile device.

In some embodiments, a headphone adapter 1080 may be provided in the kit described above. The headphone adapter 1080 may be generally configured to connect a headphone jack that is too large (e.g., has too large of a circumference) to fit through the opening in the case to properly connect within the headphone inlet of a mobile device, to a headphone jack inlet on a mobile device when the mobile device is within the case 10. The headphone adapter 1080 may have a female end 1081 connected to a male end 1082 by a connecting wire 1083. In use, a user may plug a headphone jack (not pictured) into the female end 1081, then the user may plug the male end 1082 into the mobile device. The user may plug a distal end 1084 of the male end 1082 through the headphone aperture 1085, and into a device within the case, as illustrated in FIG. 1A. Once connected, the headphone adapter 1080 can transmit sound from the mobile device through the adapter 1080 to the headphones. In an embodiment, no external wire, such as connecting wire 1083, connects the male and female ends. In such an embodiment, the female end and male end are externally directly connected to one another.

Figure 5:
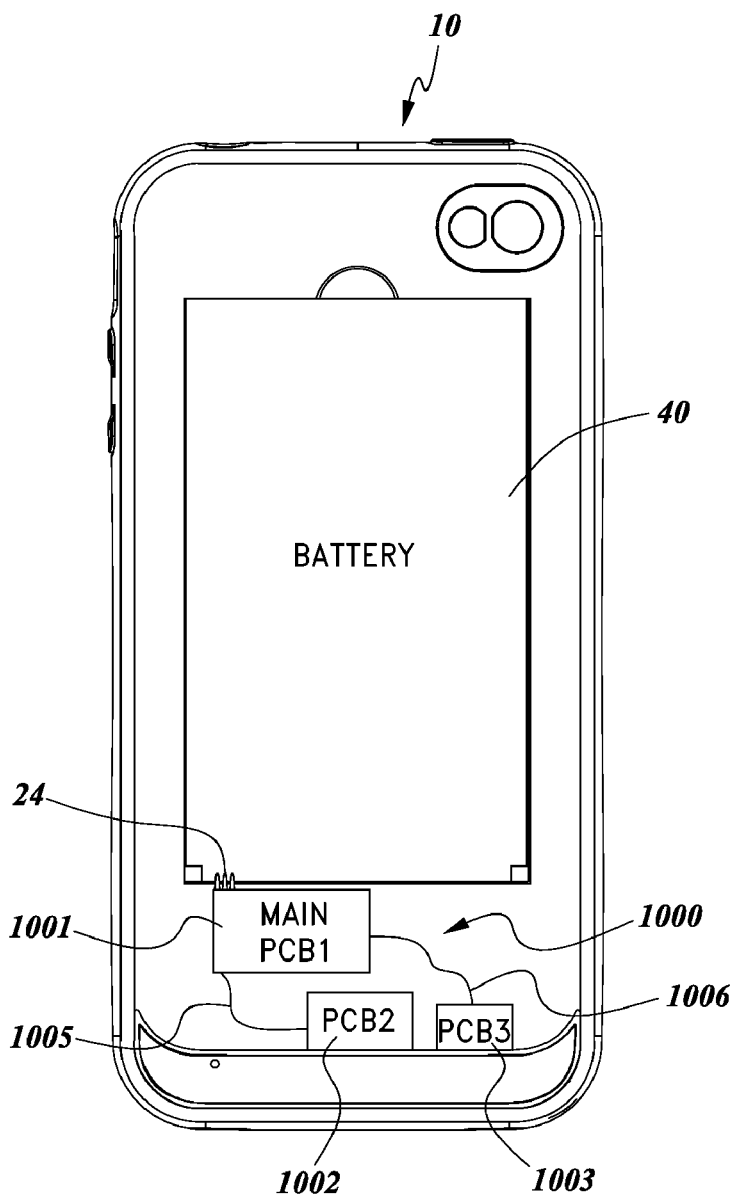
FIG. 5 is a top schematic layout view illustrating the electrical components for the base portion of the case of FIG. 1.

FIG. 5 illustrates a schematic view of the case 10 illustrating the electrical components. As shown in the figure, there are three printed circuit boards (or "PCBs"), the main PCB1 1001, PCB2 1002, and PCB3 1003. PCB1 1001 is the main PCB, which may contain such items as a controller, firmware, an authentication chip, a battery charging circuit, and LEDs. PCB2 may contain a case connector, such as a 30 pin connector. PCB3 1003 may contain the USB connector. Main PCB1 1001 connects to PCB2 1002 through a cable 1005. Main PCB1 1001 also connects to PCB3 1003 through a cable 1006. Main PCB1 may also be electrically connected to the prongs 24 to transfer electrical charge to and from the rechargeable battery 40.

As shown in the embodiment of FIG. 1, the battery aperture 22 may be shaped to contain a rechargeable battery 40 and located on the inside panel 25 of the base portion 20. The battery aperture 22 may comprise a detent 23 shaped in a semi hemispherical fashion to allow a user to easily remove a battery 40 from the battery aperture 22. The battery aperture 22 may also comprise conductors, such as leads or prongs 24 to allow a battery 40, when placed in the case, to transfer electrical charge to the electrical components within the base portion 22 (not illustrated). The prongs 24 may also provide additional pressure to the battery 40, when placed in the battery aperture 22, to assist in keeping the battery 40 in place in the base portion 20.

As illustrated in the embodiment of FIG. 1, the battery 40 may be shaped generally rectangularly to fit in the battery aperture 22. The battery 40 may have a top end 42, a bottom end 44, a left side 46, and a right side 48. Electrical connectors 45 may be disposed on the bottom end 44 and be located on the bottom end to correspond with the prongs 24 in the battery aperture 22. This may allow for an electrical charge to transmit between the battery 40 and the electrical components. The battery 40 may have a thickness t. The thickness t may be roughly the same as the height of the battery aperture. Hence, when the battery 40 is in place in the battery aperture 22, a mobile device, when placed in the case 10 lies flat. In some embodiments, the thickness t may be slightly less than the height of the battery aperture, hence still allowing the mobile device when placed in the case to lie flat.

Desirably, the thickness t of the battery 40 is in the range of between 2 mm (or about 2 mm) and 12 mm (or about 12 mm) thick. According to other embodiments, the thickness t is in the range of between 3 mm (or about 3 mm) and 10 mm (or about 10 mm), between 3 mm (or about 3 mm) and 7 mm (or about 7 mm), between 6 mm (or about 6 mm) and 9 mm (or about 9 mm), or between 7 mm (or about 7 mm) and 8 mm (or about 8 mm). Desirably, the thickness t of the battery 40 is less than 13 mm (or about 13 mm), less than 10 mm (or about 10 mm), less than 8 mm (or about 8 mm), less than 7 mm (or about 7 mm), less than 6 mm (or about 6 mm), or less than 5 mm (or about 5 mm).

The battery 40 may comprise any suitable (preferably rechargeable) battery. The battery may be able to hold 3.7 V or 1700 mAh of charge, 1600 mAh of charge, and the like. Such batteries may include a lithium ion battery. In other embodiments, the battery may be a nickel cadmium, nickel metal hydride, lithium-ion polymer, lithium polymer, lead acid, or any other type of rechargeable battery. In some embodiments, the battery may be disposable. The battery may be advantageously shaped to fit within the battery aperture 22. The battery may comprise one or more batteries, for example two batteries, three batteries, ten batteries, or however many a user may possess.

While the illustrated embodiment in FIGS. 1, 2, and 4 shows the battery aperture 22 located roughly in the center of the inside panel 25 of the base portion 20, in other embodiments the battery aperture may be located on any portion of the inside panel 25 of the base portion 22, e.g. near the top, bottom, left hand side, right hand side, and the like. According to other embodiments, the battery aperture may be located on the back panel 29 of the base portion 20. In such embodiments, the battery aperture may be covered by a door that may be opened by a user by pressure, or by pressing a button located on the base portion 20.

The plug 28 may extend from the nested portion 26 and be adapted to be inserted into the port jack of a mobile device. The plug 28 may be able to communicate electronically with a mobile device and deliver charge to a mobile device from the case 10 containing a battery 40 containing at least a partial charge. In some embodiments, the plug 28 may also be configured to send data to and receive data from a mobile device.

The controls 27 of the nested portion 26 may allow a user to turn the battery case on or off and/or check the charge level of the rechargeable battery 40 when inside of the case 10. The charge level may be indicated by lights such as LED lights 2030 located inside and visible on the surface of the nested portion 26. The controls 27 may also comprise a light that illuminates when the case is on and is providing charge to a mobile device or if the charge level is being tested. The light corresponding to the controls 27 may turn off when the case 10 is not being used to provide charge to a mobile device such as when the user presses the control to turn the power off or when the case runs out of battery energy or if there is no battery 40 within the battery aperture 22.

As shown in FIG. 4, the nested portion 26 may also comprise an inlet 31. The inlet 31 may correspond to or receive a charging cable 1010 that may be used to charge the battery 40 when contained in the battery aperture 22 without removing the battery 40 from the case 10. The charging cable may be configured to plug into a power source, for example, a computer or laptop device, a car outlet, a power outlet and the like.

Also as illustrated in FIG. 4, the nested portion may comprise a speaker aperture 32 that may correspond to the speaker of a mobile device. The speaker aperture may allow access to the speaker of the mobile device so that the user may listen to music or audio from a mobile device without the case 10 obstructing the sound. In some embodiments (not illustrated), the base portion 20 may comprise more than one speaker aperture in different locations, corresponding to the speaker location on the mobile device.

In some embodiments, the back panel 29 is made of a lighter plastic or polymeric material than the inside panel 25 that reduces the total weight of the case 10. Additionally, the material may be impact resistant enough to resist fracture when the case 10 containing a mobile device is dropped from a user's hand, a table, a desk and similar heights onto a variety of surfaces including concrete, asphalt, carpet, and the like. Such a height may include heights such as six feet, five feet, four feet, three feet, and the like. The material may also exhibit beneficial properties such as scratch resistance, modulus, and the like.

Figure 4B:
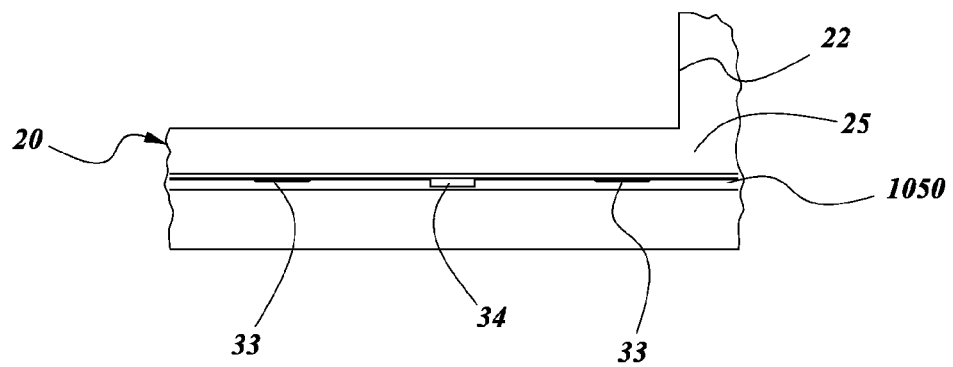
FIG. 4B is a top plan magnified view of a base portion of the case of FIG. 1.
Figure 4C:
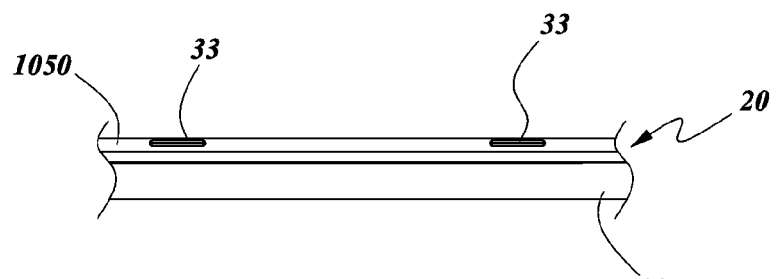
FIG. 4C is a right side plan magnified view of a base portion of the case of FIG. 1.

As illustrated in FIGS. 4B-4C, the inside panel 25 may extend above the back panel 29, forming a peripheral flange 1050. As is illustrated in FIGS. 4 and 4A-4C, the peripheral flange 1050 may include one or more tabs 33 and recesses 34, corresponding to tabs 18 and recesses 19 on the bumper portion 12. The base portion 20 and the bumper portion 12 of the case 10, then may be attached to one another by aligning the bumper portion 12 with the base portion 20 and applying pressure to force the corresponding tabs and recesses on the bumper portion 12 and base portion 20 to interlock with one another and snap into place. To remove the bumper portion 12 from the base portion 20, a user may flex the bumper portion 12 so that one or more of the corresponding recesses and tabs detach from one another, allowing the bumper portion 12 to release from the base portion 20.

In some embodiments only one of the bumper portion 12 or the base portion 20 may comprise tabs or recesses. According to one embodiment, the bumper portion may comprise a single, uniform tab extending inwardly around the perimeter of the inner surface 85, and the base portion comprises a uniform recess extending inwardly around the perimeter of the peripheral flange that receives the uniform tab of the bumper portion.

The bumper portion and the base portion may be designed with a system of tabs and inlets or indents that securely fit the two pieces together in place to prevent separation of the bumper portion from the base portion when the assembled case is dropped from a user's hand, a table, a desk and similar heights onto a variety of surfaces including concrete, asphalt, carpet, and the like. Such a height may include heights such as six feet, five feet, four feet, three feet, and the like. According to some embodiments, this configuration allows the bumper portion and the base portion to stay attached to one another both when a mobile device is contained within the assembled case and when a mobile device is not contained within the assembled case.

Figure 6A:
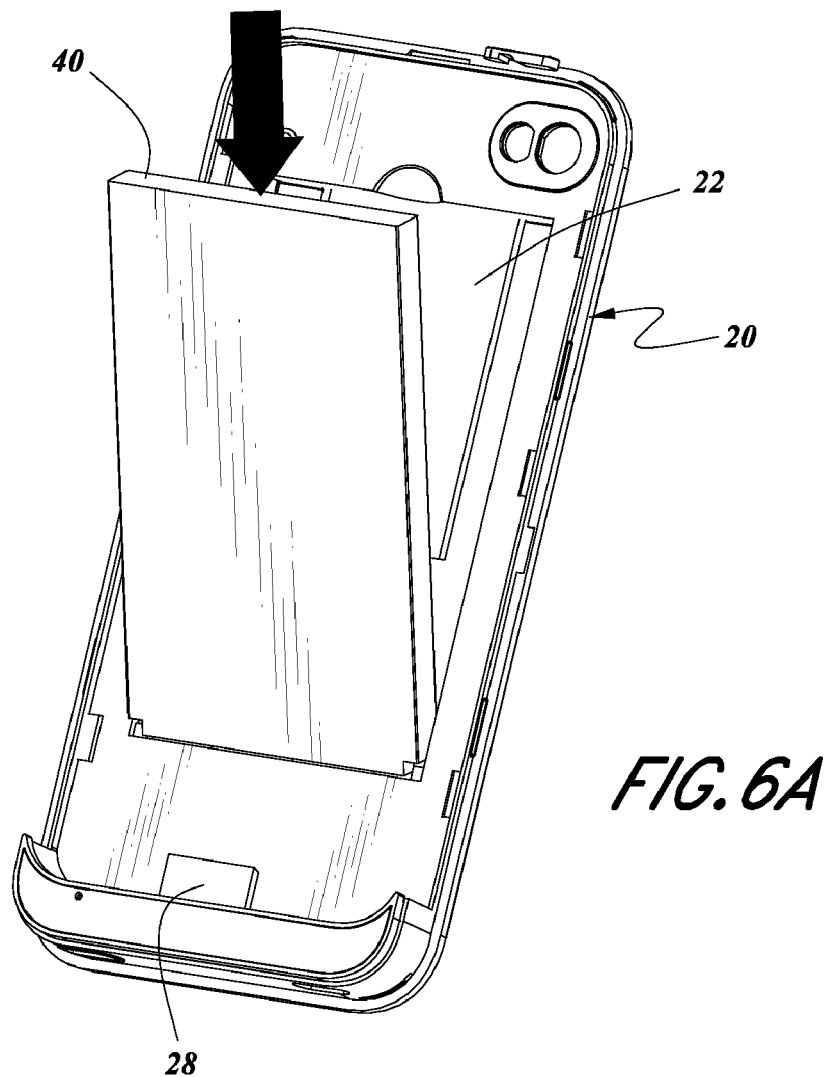
FIG. 6A is a front side perspective view of a base portion of a case according to the case of FIG. 1.
Figure 6B:
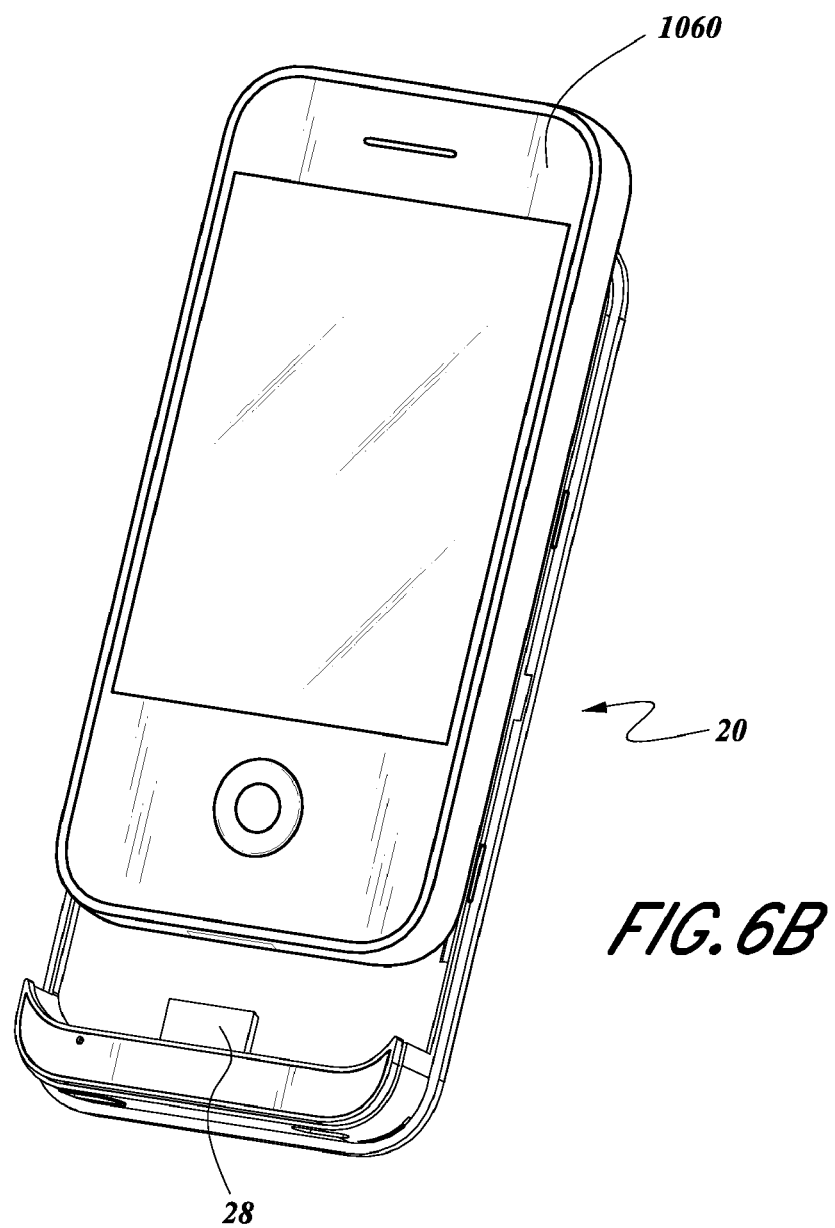
FIG. 6B is a front side perspective view of a mobile device being secured on the base portion of a case according to the case of FIG. 1.
Figure 6C:
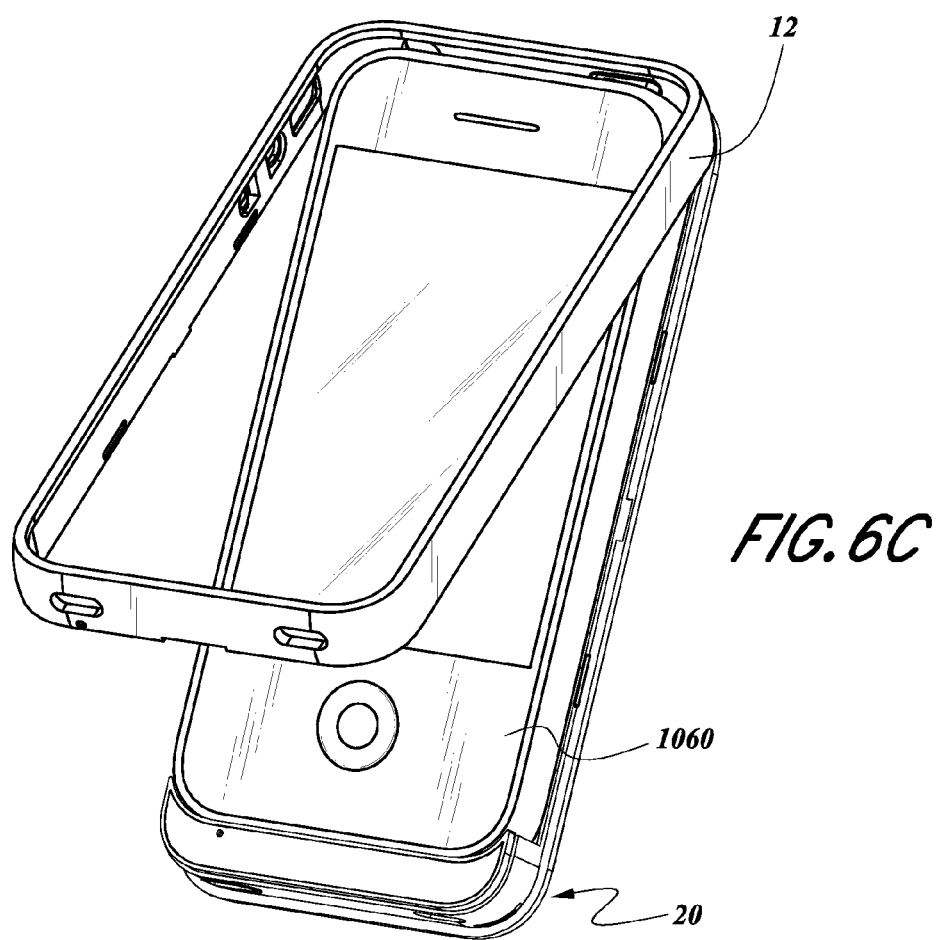
FIG. 6C is a front side perspective view of a mobile device being further secured in a case according to the case of FIG. 1.
Figure 6D:
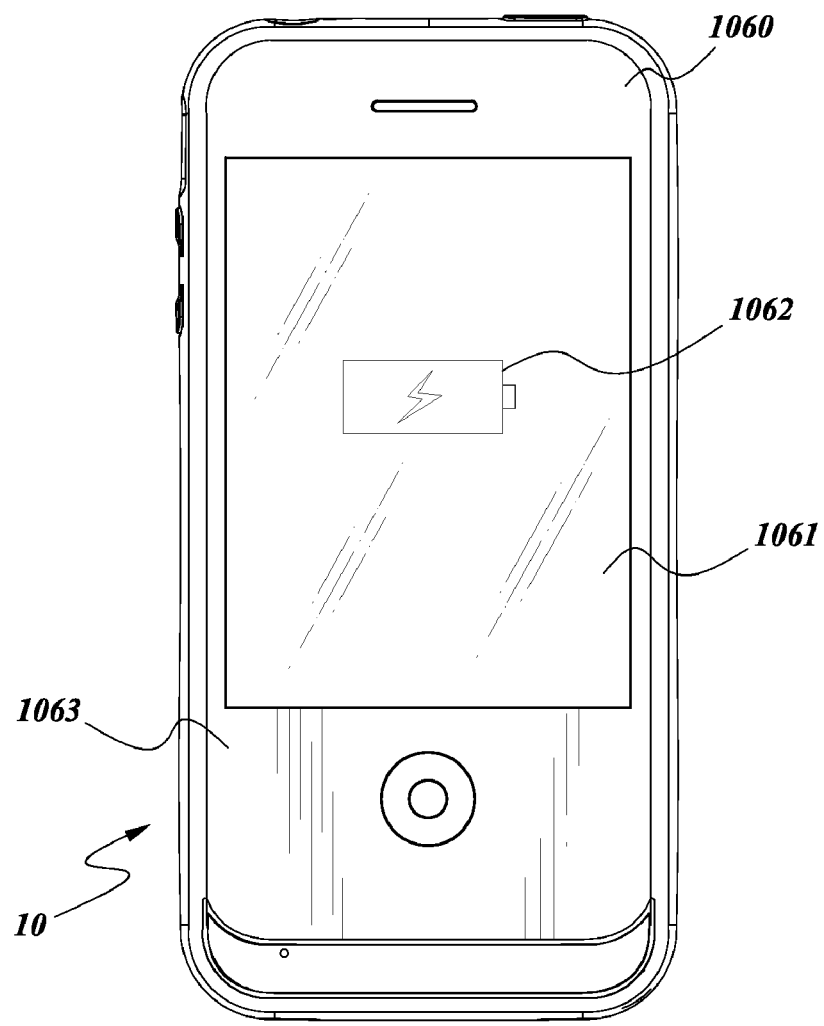
FIG. 6D is a front plan view of a base portion of a mobile device in a case according to the case of FIG. 1.

As illustrated by the embodiment in FIGS. 6A-6D, a user may insert a rechargeable battery and mobile device into the case 10 to provide extra electrical charge to the mobile device to charge an internal battery in a mobile device. As shown in FIG. 6A, first a rechargeable battery 40, holding at least a partial charge, is inserted into the battery aperture 22 in the base portion 20. Then, as shown in FIG. 6B, the user may attach a mobile device 1060 to the base portion 20 by connecting a mobile device 1060 to the plug 28. Then, as shown in FIG. 6C, the user may attach the bumper portion 12 to the base portion 20 by aligning the bumper portion 12 with the base portion 20 and applying pressure to force the corresponding tabs and recesses on the bumper portion 12 and base portion 20 to interlock with one another and snap into place, thus securing a mobile device 1060 within the case 10. As shown by FIG. 6D, when a user turns on the case by depressing the controls 27 (not shown), the mobile device may display an indicator 1062 on its screen 1061 to confirm that an electrical charge is being provided to the mobile device 1060 through the case.

When a mobile device is within the assembled case 10, the bumper portion 12 may extend around the sides of a mobile device. The inner side of the bumper portion 12 may contact a mobile device. The nested portion 26 may contact a bottom edge of a mobile device. The inside panel 25 of the base portion 20 may contact or partially contact a back side of a mobile device. A portion of the bumper portion 12 may extend partially over a front side of a mobile device to help secure a mobile device in the case 10. The front of a mobile device 1060 may comprise the display of a mobile device, a keyboard, a rollerball, a control pad, a touch screen (for example, 1061 in FIG. 6D), and the like.

As illustrated in FIG. 6D, desirably, the bumper portion desirably surrounds each of the sides of the four corners of the mobile device. Desirably, the bumper portion surrounds each of the ends and sides of the mobile device. Desirably, the bumper portion substantially covers each of the sides of the four corners of the mobile device. Desirably, the bumper portion substantially covers each of the ends and sides of the mobile device.

Figure 7:
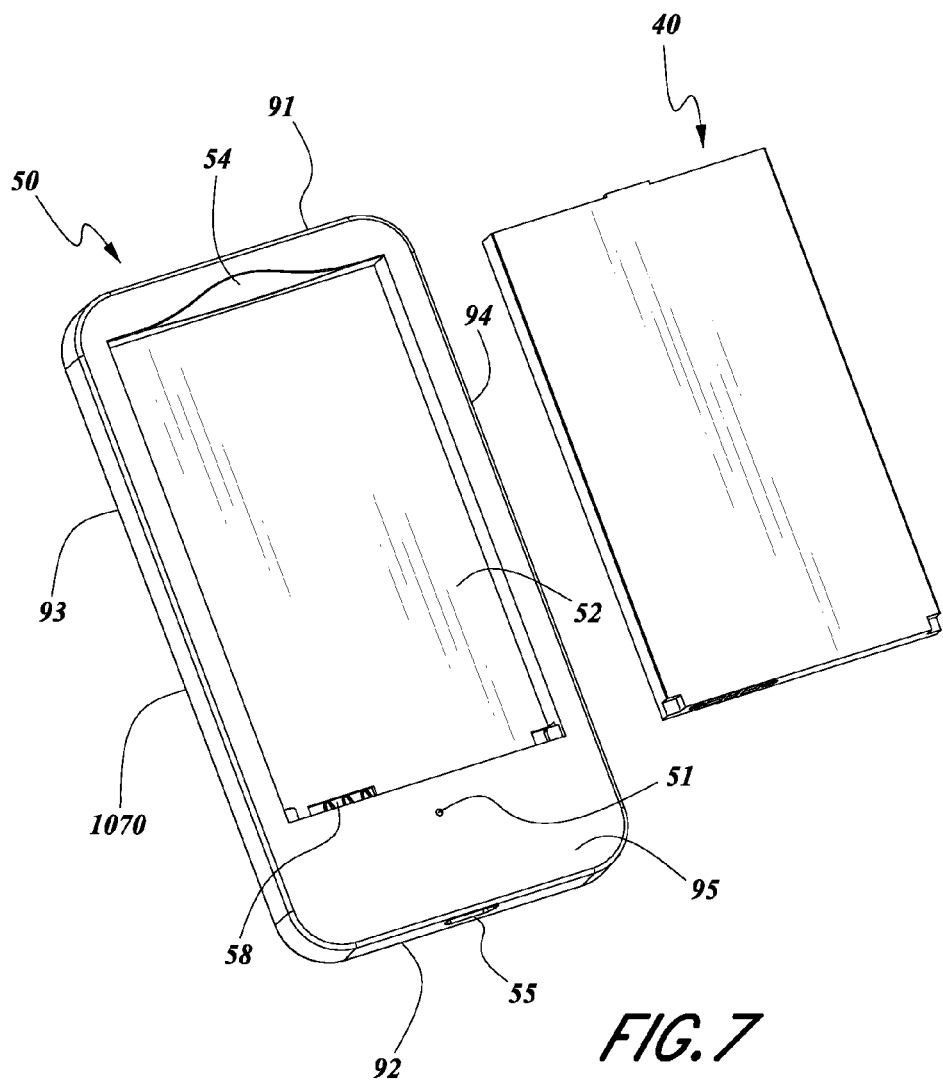
FIG. 7 is a front side perspective view of a charger according to another embodiment.

FIG. 7 illustrates a charger 50 according to an embodiment. The charger 50 may have a top end 91, a bottom end 92, a left side 93, and a right side 94. The charger 50 may also have a front side defining a front face 95 of the charger and a rear side defining a rear face 96 of the case. The charger 50 also comprises a side edge 1070 that defines the side perimeter and thickness of the charger, and connects the front face 95 and the rear face 96. The charger 50 is generally provided to charge a rechargeable battery 40, as described previously.

As is illustrated in FIG. 7, the charger may be shaped in a generally rectangular fashion. However, in other, non-illustrated embodiments, the charger may be generally circular, triangular, or any other suitable geometric shape.

The charger 50 may define a battery aperture 52, shaped to contain a rechargeable battery 40. The battery aperture 52 may comprise a detent 54 shaped in a semi hemispherical fashion to allow a user to easily remove a battery 40 from the battery aperture 52. The charger 50 may also comprise an inlet 55. The inlet 55 may correspond to a charging device (such as cable 1010 in FIG. 1) that may be used to charge the battery 40 when the battery 40 is placed in the battery aperture 52. LED light 51, located on the front face 95 of the case, may become illuminated when the charger is connected to a power source by the charging cable. The charging cable may be configured to plug into a power source, for example, a computer or laptop device, a car outlet, a power outlet and the like. The charging cable may be of the same type disclosed above.

According to some embodiments, the charger 50 comprises a mount instead of an aperture shaped like the battery 40. The mount may comprise metal prongs to transfer power from a charger to the battery attached to the mount. A mount may support the battery in the charger, but without surrounding the battery on all four sides as the embodiment illustrated in FIG. 7.

As illustrated in FIG. 7, the charger 50 may also comprise conductors, such as leads or prongs 58. The prongs 58 may extend from an end wall defining the battery aperture and allow an electrical charge to be transferred to a battery 40 when placed in the charger 50 when a charging cable is connected to the inlet 55 and a power source. The prongs 58 may also provide additional pressure to the battery 40, when placed in the battery aperture 52, to assist in keeping the battery 40 in place in the charger 50. The prongs 58 may also transfer electrical charge from the battery 40 in the charger when the charger 50 is unplugged from a power source.

Figure 8:
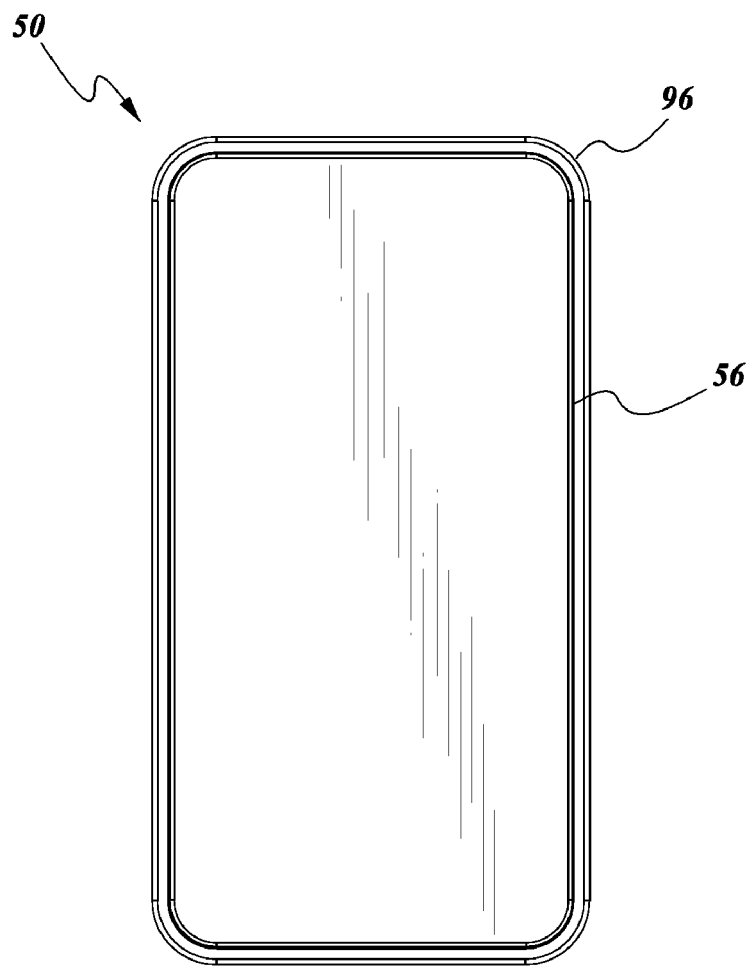
FIG. 8 is a rear plan view of the charger of FIG. 7.

FIG. 8 illustrates another view of an embodiment of the charger 50. According to an embodiment, the back side of the charger 50 may comprise a layer 56 of material. The layer 56 may comprise a polymeric material such as rubber. In some embodiments, the layer 56 may be tacky. The layer 56 may exhibit a coefficient of fraction in the range of 0.75-4.5. The layer 56 may prevent the charger 50 from sliding when subjected to a shearing or linear force when on a hard, flat or relatively surface such as a table, desk, car dashboard, airplane or train tray table, and the like. In some embodiments, the layer 56 may prevent the charger from sliding or otherwise coming displaced when placed inside of the case 10. In other embodiments, the layer 56 may prevent the charger from sliding when placed on top of the inside panel 25 of the base portion 20.

In some embodiments, the charger may comprise an additional port that may be used to transfer power from a battery in the charger, when the battery contains a charge, to another power receiving entity. In some embodiments, the port may comprise an USB port. Thus, in some embodiments containing the additional port, the charger may also transfer power from a battery within the charger containing a charge to charge a laptop, tablet, PDA, e-reader, mp3 player (such as an iPod®), or any other suitable electronic device. According to some embodiments, the charger may also comprise an aperture shaped to form a negative impression of a data port.

According to an embodiment, a charger 50 may be able to discharge power from a rechargeable battery contained within, to the case 10 when a port on the charger is inserted into the inlet 31.

In an embodiment, the charger may have an insert configured to receive either a micro-usb end or a USB end or any end of a charging cable. In such an embodiment, one charging cable may be used to connect the charger to a power source, and a different charging cable inserted in the insert may be connected to the inlet of a case. This configuration may allow for a rechargeable battery contained within the charger, the case, and/or a mobile device contained within the case, and/or a rechargeable battery contained within the case to all be charged at the same time. In such an embodiment, the power source charges the charger, which in turn charges the case, which in turn charges a rechargeable battery contained within the case and/or a mobile device contained within the case.

Figure 9:
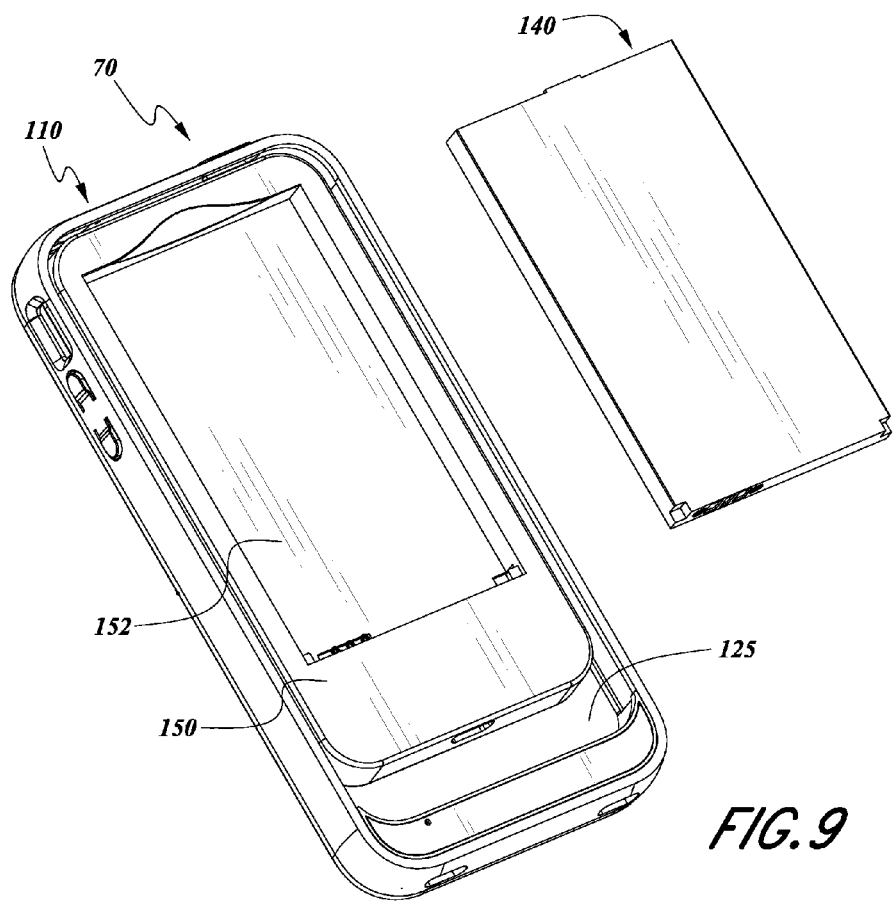
FIG. 9 is a front side perspective view of a kit according to yet another embodiment.
Figure 10:
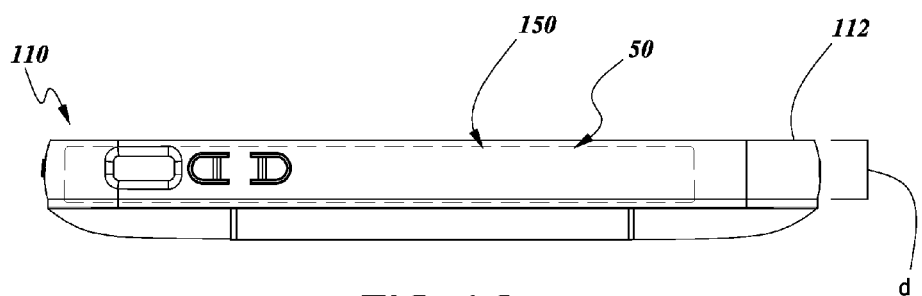
FIG. 10 is a left side plan view of the kit of FIG. 9.

FIG. 9 illustrates an embodiment of a kit 70 comprising a case 110, a charger 150, and at least one rechargeable battery 140. According to some embodiments, the case 110, charger 150, and/or at least one rechargeable battery 140 encompass the features discussed in the embodiments of cases, chargers, and rechargeable batteries discussed above. As is shown in FIG. 9, the charger 150 fits within the perimeter of the case 110. The charger 150 may contact the inner surface 125 of the case 110. When placed inside the case 110, the charger 150 is contained within the case by the bumper portion 112. The bumper portion may define at least one sidewall which extends transverse to the plane which corresponds to the rear surface of the mobile device when the mobile device is received by the case. For ease of reference, it is assumed that the inside panel 25 and the plane are positioned horizontally and, accordingly, the sidewall extends transversely or, preferably vertically. As is illustrated in FIG. 10, which illustrates the charger 150 within the case 110, the charger 150 is flush or substantially flush with the top edge of the bumper portion 112. The bumper portion 112 has a depth d. The depth of the charger 150 may be equal to or less than d.

In some embodiments, as illustrated in the embodiments of FIGS. 9 and 10, when the charger 150 is positioned inside of the case 110, the charger 150 does not extend above at least one, and preferably above any vertically extending side of the case. This may mean that the charger 150 is flush with the bumper portion 112, or that, when placed against the inner surface 125 of the case 120, the charger 150 does not extend as high vertically as the bumper portion.

In some embodiments, a battery 140 may also be stored in the battery aperture 152 of the charger 150 when it is placed in the case 110. According to other embodiments, a rechargeable battery 140 may be placed in a battery aperture of the case 110 (not illustrated) when the charger 150 is placed in the case. According to yet other embodiments, a rechargeable battery may be placed in the battery aperture 152 of the charger 150 and a different rechargeable battery may be placed in the battery aperture of the case 110. Thus a kit according to an embodiment may be able to store up to at least two rechargeable batteries and the charger in the space of the case 110 itself.

The charger's compact design and ability to fit within the case allows for the kit described in aforementioned embodiments to travel easily. The compact kit may be able to fit into backpacks, luggage, purses, pockets, and the like for easy travel. Also, the ability for the pieces of the kit to fit within one another lessens the likelihood that the pieces of the kit will become separated from one another in a large bag or purse. According to some embodiments, the charger has a polymeric coating on the back of the charger that prevents the charger from slipping when placed in the case. This coating, in some embodiments, may also help adhere the charger to the case when a user is traveling, so that the components of the kit are more likely to stay together.

The kit, according to some embodiments, also has the ability to provide a continuous stream of power to a mobile device over an extended period of time. According to one method, a user may charge a rechargeable battery using the charger while a mobile device is inserted into the case where an already-charged rechargeable battery has already been inserted into the case. The user may use the controls to transfer power to the mobile device when needed (e.g., when the mobile device runs out of its own internal battery). Once the rechargeable battery inside the case has drained, a user may remove the mobile device, remove the drained battery, replace the drained battery in the battery aperture of the case with the rechargeable battery containing at least a partial charge, replace the mobile device in the case, then use the controls when necessary to provide additional charge to the mobile device. The drained battery may be inserted into the charger, which may be then connected to a power source to restore charge to the rechargeable battery. In some embodiments, several pre-charged rechargeable batteries may be carried by the user, so that a recharging step is unnecessary.

By cycling draining and charging rechargeable batteries within the case and charger, respectively, a user can keep their mobile device on and/or functioning for extending periods of time without having to plug either the phone or the case into a power source. This is beneficial for circumstances where a user may have limited or no access to a power supply, e.g. on a long flight or train ride, at an airport or train station, on a long car ride, when travelling in the wilderness, and the like.

Figure 11:
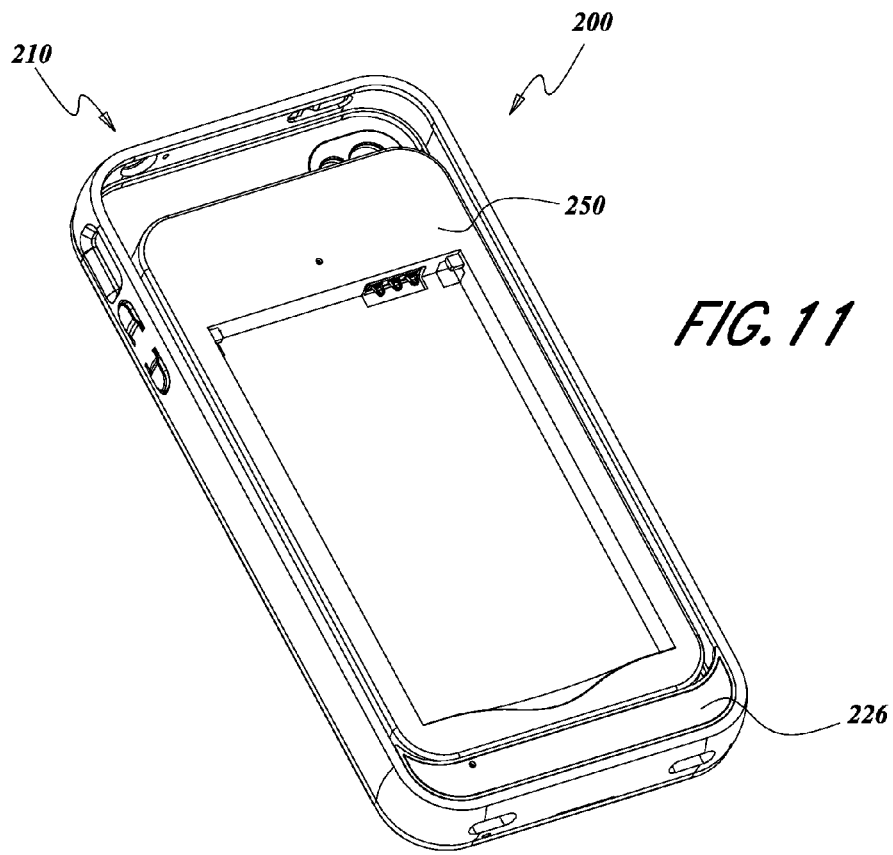
FIG. 11 is a front side perspective view of a system according to yet another embodiment.

As shown in the embodiment illustrated in FIG. 11, a system 200 may comprise a case 210 and a charger 250 configured to attach to the interior of the case 210. The system may also include one or more rechargeable batteries 240. According to some embodiments, the case 210, charger 250, and/or at least one rechargeable battery 240 encompass the features discussed in the embodiments of cases, chargers, and rechargeable batteries discussed in embodiments above. The embodiment of FIG. 11 shows the charger 250 attached to the case 210. The charger 250 may have a recess defining a negative relief image of a protrusion in the case 210. In some embodiments, the recess may be shaped to receive a data port protrusion. In other embodiments, the recess may be shaped to receive a protrusion that has been pre-formed into the base portion 210 or the bumper portion 212 of the case.

Figure 12:
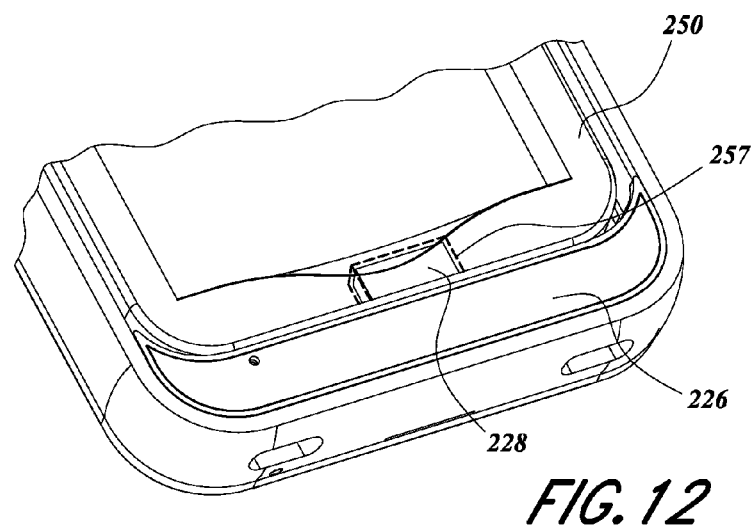
FIG. 12 is a front side perspective magnified, cutaway view of a bottom portion of the system of FIG. 11.

FIG. 12 illustrates a magnified view of the bottom portion of the embodiment of FIG. 11, with a cutaway view of the port 228 inside of the charger recess 257. In this embodiment, the charger 250 is securely connected to the nested portion 226 of the base portion 220 of the case 210 via the port 228. When connected, the charger 250 desirably should not separate from the case 210 due to common forces that an object may experience when in a purse, backpack, luggage and the like. This can ensure that the pieces of the system 200 do not come separated from one another in travel and are thus easy for a user to find as well as compact.

According to some embodiments, the charger further comprises a mechanism such as a latch in the recess to further guarantee that the charger will not come separated from the case when they are connected to one another during travel. In some embodiments, the charger comprises a button connected to the latch that the user can press to release the latch and the charger from the case after the charger has been connected to the case.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A kit comprising:
   at least one rechargeable battery;
   a case configured to protect a mobile device, the case comprising:
   a rear panel;
   at least one side protector extending transverse to said rear panel;
   a rechargeable battery charger; and
   an aperture sized to removably contain said at least one rechargeable battery;
   wherein the case is configured to receive the mobile device such that said at least one rechargeable battery is exposed when the at least one rechargeable battery is positioned within the aperture and the mobile device is not positioned within said case, and
   said case is configured such that a back of the mobile device covers the aperture and the at least one rechargeable battery within the aperture securing the at least one rechargeable battery in place between the back panel and the mobile device when the at least one rechargeable battery is positioned within the case and the mobile device is positioned within the case;
   said case further comprising:
   a first electrical connector for engaging said mobile device; and
   a second electrical connector for engaging said at least one battery when said battery is positioned within said aperture;
   wherein when said mobile device is engaged with the first electrical connector and said at least one rechargeable battery is engaged with said second electrical connector, the at least one rechargeable battery can charge the mobile device; and
   a second rechargeable battery charger comprising a surface for receiving at least one rechargeable battery.

2. The kit of claim 1, wherein the surface of the second rechargeable battery charger at least partially defines a recess and the at least one rechargeable battery is positionable within the recess of the second rechargeable battery charger.

3. The kit of claim 1, wherein the kit further comprises a mobile device.

4. The kit of claim 1, wherein the case comprises a bumper comprising a single continuous piece.

5. The kit of claim 1, wherein, when the second rechargeable battery charger is positioned within the perimeter of the case, the second rechargeable battery charger does not extend above the at least one side protector.

6. The kit of claim 1, wherein the at least one rechargeable battery comprises at least two rechargeable batteries.

7. The kit of claim 1, said case further comprising an opening in at least one of said side protectors permitting communication with a headphone port when a mobile device is within said case, said kit further comprising a headphone adapter sized to fit through said opening.

8. The kit of claim 1, wherein the kit further comprises a data or charging device.

9. The kit of claim 8, wherein the data or charging device comprises external contacts or means to charge inductively.

10. The kit of claim 8, wherein the data or charging device comprises a charging cable, wherein the charging cable is configured to plug into a power source.

11. The kit of claim 8, wherein the data or charging device comprises a data cable, wherein the data cable is configured to plug into a computer and convey charge and data to the case from the computer.

12. A protective case for a mobile device comprising:
    electrical components, at least one port, and an aperture sized to contain at least one rechargeable battery;
    a base portion, the base portion comprising the electrical components and the aperture sized to contain at least one rechargeable battery;
    a bumper comprising a single piece, the bumper configured to fit on top of the base portion; and
    a nested portion connected to the base portion, said bumper, said base and said nested portion defining an opening for receiving a mobile device, said bumper being selectively removable from said base portion.

13. The protective case of claim 12, further comprising the at least one rechargeable battery.

14. The protective case of claim 12, wherein the base portion further comprising a rechargeable battery charger.

15. A system comprising:
    at least one rechargeable battery; and
    a case configured to protect a mobile device, the case comprising:
    a rear panel;
    at least one side protector extending transverse to said rear panel;
    a rechargeable battery charger;
    an aperture sized to removably contain said at least one rechargeable battery;
    a first and second electrical connectors, wherein when said mobile device is engaged with the first electrical connector and said at least one rechargeable battery is engaged with said second electrical connector, the at least one rechargeable battery can charge the mobile device;
    wherein the case is configured to receive the mobile device such that a back of the mobile device covers the aperture and the at least one rechargeable battery within the aperture securing the at least one rechargeable battery in place between the back panel and the mobile device, and said at least one rechargeable battery is exposed when the at least one rechargeable battery is positioned within the aperture and the mobile device is not positioned within said case.

* * * * *